May 24, 1960     F. W. DEWING     2,937,546
CONDUIT REAMER
Filed July 24, 1956
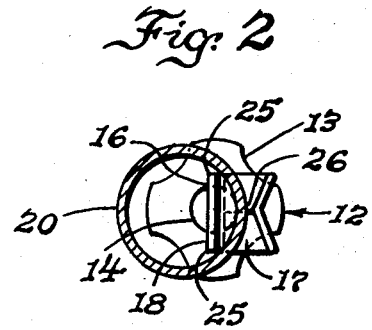
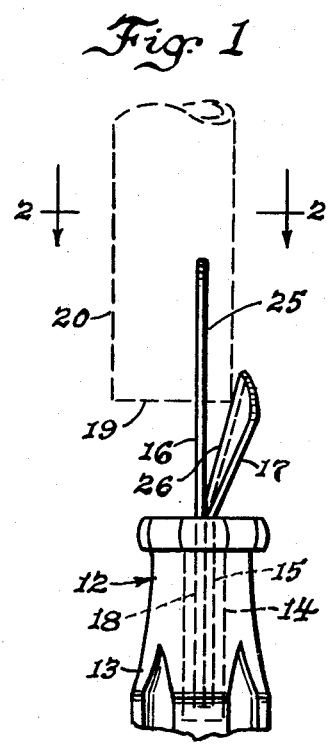
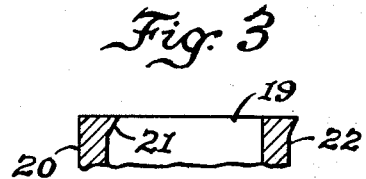
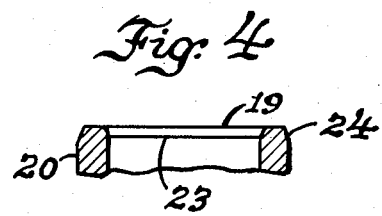
Inventor
Francis W. Dewing
Atty.

United States Patent Office 2,937,546
Patented May 24, 1960

2,937,546
CONDUIT REAMER
Francis W. Dewing, 1135 W. State St., Rockford, Ill.
Filed July 24, 1956, Ser. No. 599,745
4 Claims. (Cl. 77—73)

This invention relates to a hand-operable reamer designed for use by electricians for reaming the ends of thin-walled conduit, to remove burrs formed in the cutting of the conduit, and to round or bevel the edges inside and outside, so that insulation on wire coming in contact therewith on the inside will not be cut or snagged, and so that slip-type fittings now commonly used can be applied easily to the outside. While originally designed for the special purpose mentioned, the tool is also useful in other fields, wherever pipes or tubes have to be cut and objectionable burrs require removal, as in the field of refrigeration and air conditioning where this problem is presented with copper tubing.

The principal object of my invention is to provide a reamer having two blades arranged in the form of a V, the one blade working on the inside diameter and the other on the outside diameter, the two blades being mounted in or on a handle to be turned once around to the right and back to the left throughout the circumference of the end of a piece of conduit, pipe or tubing for removal of burrs, and reaming and bevelling the cutoff end whether it be cut off square or on an angle. The V arrangement of the blades makes the tool adaptable universally to different wall thicknesses and different diameters. It also produces the desired bevels on the inner and outer edges that are reamed.

The invention is illustrated in the accompanying drawing, in which—

Fig. 1 is a side view of a conduit reamer made in accordance with my invention, indicating in dotted lines the end of a conduit to be reamed;

Fig. 2 is an end view of the reamer, as seen on the line 2—2 of Fig. 1, the conduit being indicated in section, and Figs. 3 and 4 are enlarged sectional details of the cutoff end of a piece of conduit, or the like, indicating the burrs in Fig. 3 and the rounded or beveled edges in Fig. 4 that are obtained with the present reamer.

The same reference numerals are applied to corresponding parts in the four views.

Referring to the drawing, the reamer of my invention, indicated generally by the reference numeral 12, comprises a handle 13 of suitably elongated form, a portion of which is broken away to conserve space in the drawing and permit showing the parts on a larger scale, the handle being preferably of plastic material and having a bore 14 in one end into which the butt ends 15 of the two steel blades 16 and 17 are adapted to be pressed when the handle is heated up to a temperature where the plastic material is soft enough to permit the butt ends 15 of the blades to form their own keyways 18 in opposite sides of the bore 14, to insure a good hold and have a good driving connection. The blade 16 works on the inside diameter, or I.D., of the cut-off end 19 of a piece of conduit 20, and the blade 17 works on the outside diameter, or O.D., of said conduit. As indicated in Fig. 3, in the cutting off of a piece of conduit, there is invariably a certain amount of burr on the I.D. around one side, as indicated at 21 in Fig. 3, and also a certain amount of burr on the O.D. on the opposite side, as indicated at 22 in Fig. 3. With the present reamer, the blade 16 removes the burr 21 and bevels or rounds the end on the I.D., as indicated at 23 in Fig. 4, and the blade 17 at the same time removes the burr 22 and bevels or rounds the end on the O.D., as indicated at 24 in Fig. 4. The reamer is generally turned by hand once around the circumference in one direction and once around the circumference in the opposite direction, the longitudinal edges 25 of blade 16 doing the reaming on the I.D. at 23, and the rounded longitudinal edge 26 defined by the apex of a V formed by bending the blade 17 along the middle of that portion thereof projecting from the handle 13 working on the O.D at 24. The edges 25 of the blade 16 are preferably slightly rounded, inasmuch as the operation on the edge 23 of the conduit, pipe or tubing 20 while referred to as "reaming" is more of a scraping and smoothing or swedging action than a cutting action, and the same is true of the operation on the edge 24 by the rounded edge 26 of blade 17.

It is believed the foregoing description conveys a good understanding of the objects and advantages of my invention. The appended claims have been drawn to cover all legitimate modifications and adaptations.

I claim:

1. A tool for simultaneously smoothing and rounding or bevelling circumferentially the inner and outer edges on the cut end of a piece of conduit, pipe, or tubing comprising a blade holder, and a pair of juxtaposed elongated blades of springy metal carried on and projecting from said holder, one to engage the inner edge and the other to engage the outer edge at the same time by relative movement between the blades and the work circumferentially of said edges, the two blades forming a V therebetween in the narrow crotch of which the wall of the conduit, pipe, or tube is wedgingly received so that the two blades are spread apart and held resiliently engaged with the inner and outer edges of the work, the blade engaging the inner edge being straight and flat and disposed substantially parallel to the axis of the work, and the blade engaging the outer edge being inclined at an acute angle with respect to said axis.

2. A tool for simultaneously smoothing and rounding or bevelling circumferentially the inner and outer edges on the cut end of a piece of conduit, pipe, or tubing comprising a blade holder, and a pair of juxtaposed elongated blades of springy metal carried on and projecting from said holder, one to engage the inner edge and the other to engage the outer edge at the same time by relative movement between the blades and the work circumferentially of said edges, the two blades forming a V therebetween in the narrow crotch of which the wall of the conduit, pipe, or tube is wedgingly received so that the two blades are spread apart and held resiliently engaged with the inner and outer edges of the work, the blade engaging the inner edge being disposed substantially parallel to the axis of the work, and the blade engaging the outer edge being inclined at an acute angle with respect to said axis and being V-shaped in cross-section with the apex of the V toward the other blade and defining lengthwise thereof a rounded edge for contact with the outer edge of said conduit, pipe, or tube.

3. A tool for simultaneously smoothing and rounding or bevelling circumferentially the inner and outer edges on the cut end of a piece of conduit, pipe, or tubing comprising an elongated handle, and a pair of juxtaposed elongated blades of springy metal mounted in and extending from one end of said handle, one to engage the inner edge and the other to engage the outer edge at the same time by relative movement between the blades and the work circumferentially of said edges, the two blades forming a V therebetween in the narrow crotch of which the wall of the conduit, pipe, or tube is wedgingly received so that the two blades are spread apart and held resiliently engaged with the inner and outer edges of the work, the blade engaging the inner edge being straight and flat and disposed substantially parallel to the axis of the handle and the axis of the work, and the blade engaging the outer edge being inclined at an acuate angle with respect to said axis.

4. A tool for simultaneously smoothing and rounding or bevelling circumferentially the inner and outer edges on the cut end of a piece of conduit, pipe, or tubing comprising an elongated handle, and a pair of juxtaposed elongated blades of springy metal mounted in and extending from one end of said handle, one to engage the inner edge and the other to engage the outer edge at the same time by relative movement between the blades and the work circumferentially of said edges, the two blades forming a V therebetween in the narrow crotch of which the wall of the conduit, pipe, or tube is wedgingly received so that the two blades are spread apart and held resiliently engaged with the inner and outer edges of the work, the blade engaging the inner edge being straight and flat and disposed substantially parallel to the axis of the handle and the axis of the work, and the blade engaging the outer edge being inclined at an acute angle with respect to said axis, and being V-shaped in cross-section with the apex of the V toward the other blade and defining lengthwise thereof a rounded scraping edge for contact with the outer edge of said conduit, pipe, or tube.

References Cited in the file of this patent

UNITED STATES PATENTS

| | | |
|---|---|---|
| 777,522 | Links et al. | Dec. 13, 1904 |
| 2,202,253 | Hiatt | May 28, 1940 |
| 2,253,028 | Hassig | Aug. 19, 1941 |
| 2,470,392 | Gassman | May 17, 1949 |
| 2,483,563 | Rock | Oct. 4, 1949 |
| 2,575,779 | Young | Nov. 20, 1951 |